May 18, 1954 C. E. LOMAX 2,678,969

TIME-OF-DAY RESTRICTIVE SERVICE

Filed June 21, 1950 4 Sheets-Sheet 1

INVENTOR.
CLARENCE E. LOMAX
BY Chas. W. Candy
ATTORNEY

May 18, 1954 C. E. LOMAX 2,678,969

TIME-OF-DAY RESTRICTIVE SERVICE

Filed June 21, 1950 4 Sheets-Sheet 2

INVENTOR.
CLARENCE E. LOMAX

BY

ATTORNEY

TIME-OF-DAY RESTRICTIVE SERVICE

Filed June 21, 1950 4 Sheets-Sheet 3

INVENTOR.
CLARENCE E. LOMAX
BY
Chas. Lo. Cooly
ATTORNEY

May 18, 1954 C. E. LOMAX 2,678,969

TIME-OF-DAY RESTRICTIVE SERVICE

Filed June 21, 1950 4 Sheets-Sheet 4

INVENTOR.
CLARENCE E. LOMAX

BY Chas. W. Cauly

ATTORNEY

Patented May 18, 1954 2,678,969

UNITED STATES PATENT OFFICE 2,678,969

TIME-OF-DAY RESTRICTIVE SERVICE

Clarence E. Lomax, Chicago, Ill., assignor to Automatic Electric Laboratories, Inc., Chicago, Ill., a corporation of Delaware Application June 21, 1950, Serial No. 169,445

8 Claims. (Cl. 179—27)

This invention relates in general to telephone systems and more particularly to telephone systems which utilize restricted service, that is, where certain subscribers are prevented from establishing certain telephone connections.

The number of switches required in an automatic telephone exchange to give proper service is determined in part by the number of calls made during the busy hour or hours of the day. The generally accepted formula is that one-eighth of the total twenty-four hour daily load is carried during the one busiest hour of the day. If a certain percentage of the subscribers in the exchange could be prevented from making any local calls during those busy periods, even though these restricted subscribers were unrestricted during other periods of the day, the result would be a substantial reduction in the number of switches required to give proper service to the unrestricted lines in the exchange.

It might be considered an advantage to restrict inter-office connections attempted to be established from certain lines while intra-office calls established from these same lines would not be restricted.

It would also be advantageous to provide that the restricted service equipment be under the control of an operator under various circumstances or that it be responsive to actual traffic conditions of the system occurring during the day. It is with these foregoing facts in mind that this invention was conceived.

One object of this invention is to provide restricted service, controlled in first selectors or in inter-office repeaters, to certain subscribers' lines having access to the first selector or repeater, the restriction equipment to be operative only on local calls or only on toll calls and then only during normally busy periods of the day.

Another object of this invention is to provide restricted service equipment which is operative only during normally busy periods of the day and then only when an operator desires to render it operative.

Another object of this invention is to provide restricted service equipment which is operative only during normally busy periods of the day and then only if heavy traffic conditions warrant restriction of calls.

Another object of this invention is to provide restricted service equipment which is operative only during normally busy periods of the day and then only when an operator desires to render it operative or only when heavy traffic conditions warrant restriction of calls, provision being made that once the restricted service equipment operates, subsequent action by the operator or subsequent changes in traffic conditions will not cause a cessation in operation of the restricting equipment until the end of the normally busy period.

Another object of this invention is to provide restricting equipment for use in restricting calls from subscribers' lines which is operative during the normally busy hour or peak load periods of the day in all instances but which may be disabled during any part of the normally busy period by an operator at her discretion.

Another object of this invention is to provide call restricting equipment which will operate to restrict a call during normally busy hour or peak load periods of the day and which may also be controlled by an operator to be operative at any other period of the day that the operator may desire.

The invention will appear more clearly, and further objects will become apparent, from the following detailed description when taken in connection with the accompanying drawings, showing by way of example, a preferred embodiment of the inventive idea.

Figs. 1, 2, 3, 3A to 3D inclusive and 4 depict a telephone system which best illustrates the present invention, a system showing a number of control circuits associated with restricted service equipment for preventing the establishment of telephone connections from subscriber's lines at various times and under various conditions.

More specifically, Fig. 1 illustrates a line finder circuit 100 and associated distributor and group relays 102, the finder having access to a plurality of subscribers' lines represented by lines 101 and 103, the finder being of the well-known Strowger type and designed to provide restricted service to certain of the subscribers' lines. The finder of Fig. 1 may be associated with either the selector of Fig. 2 or the selector of Fig. 3.

Figs. 3A to 3D inclusive show various control means associated with the finder circuit and used to enable the restricted service equipment during certain preselected periods of the day and to disable it during other periods of the day.

Figure 4:
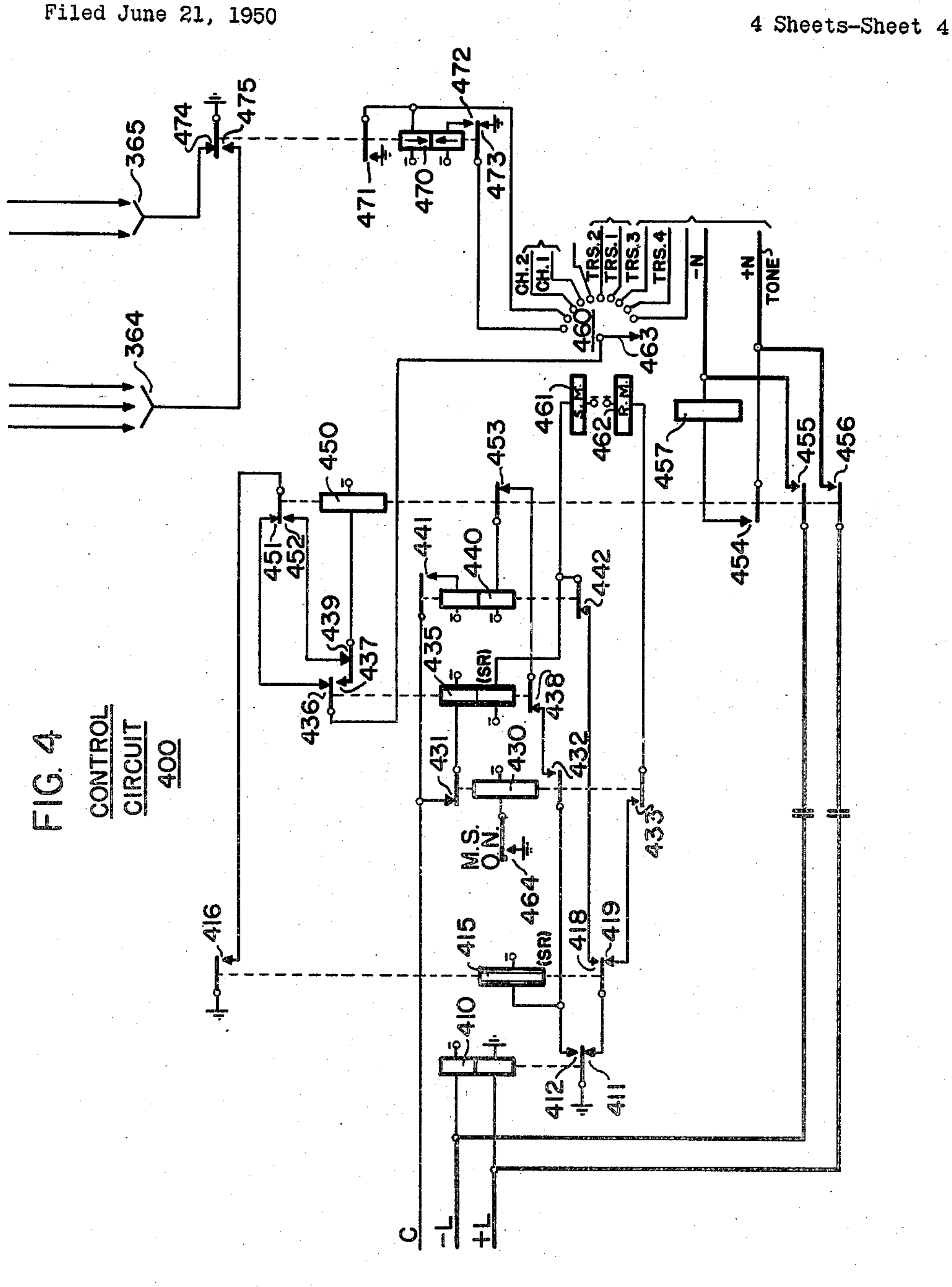

Fig. 4 illustrates a control circuit for enabling a distant operator or a local operator to exert influence over certain of the restricted service control means.

Figures 1, 3A, 3B, 3C, 3D:
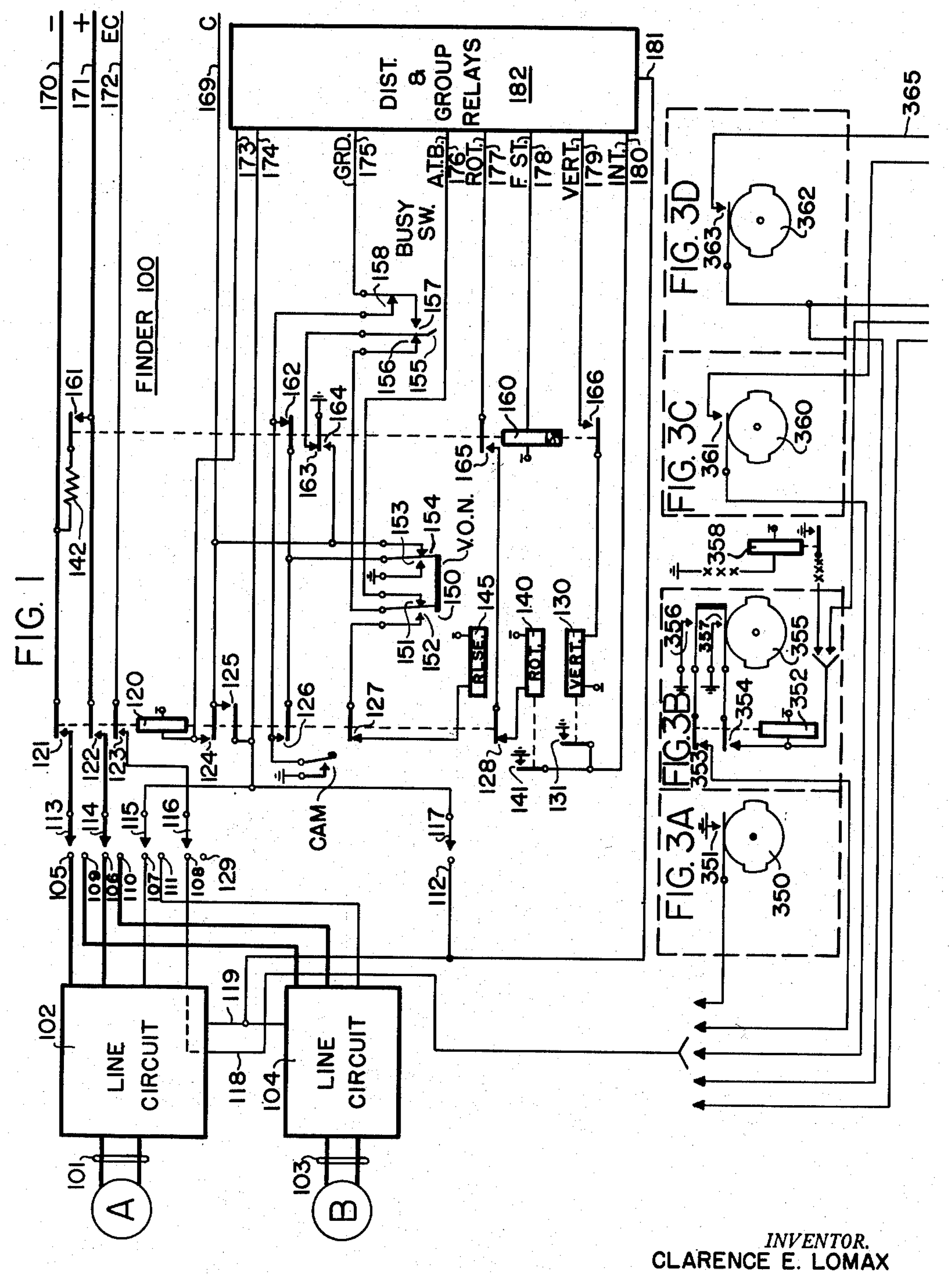
Fig. 3 illustrates a selector circuit associated with the finder of Fig. 1 and a repeater circuit for enabling a subscriber to complete inter-office connections, the repeater being designed to provide restricted service.
Figure 2:
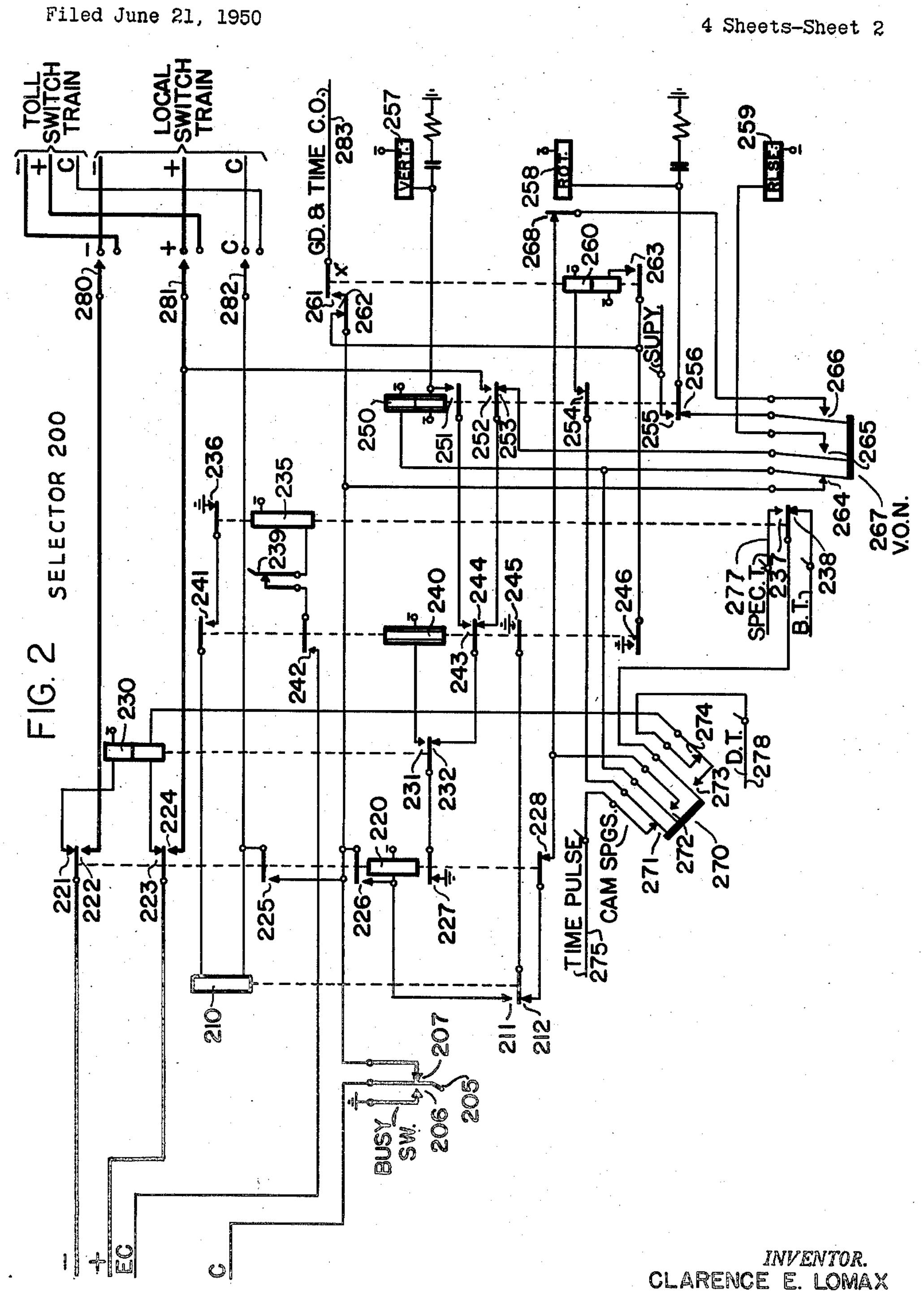
Fig. 2 illustrates a selector switch of the Strowger type associated with the line finder of Fig. 1 for establishing local and toll connections and designed to give restricted service to local calls and unrestricted service to toll calls.
Figure 3:
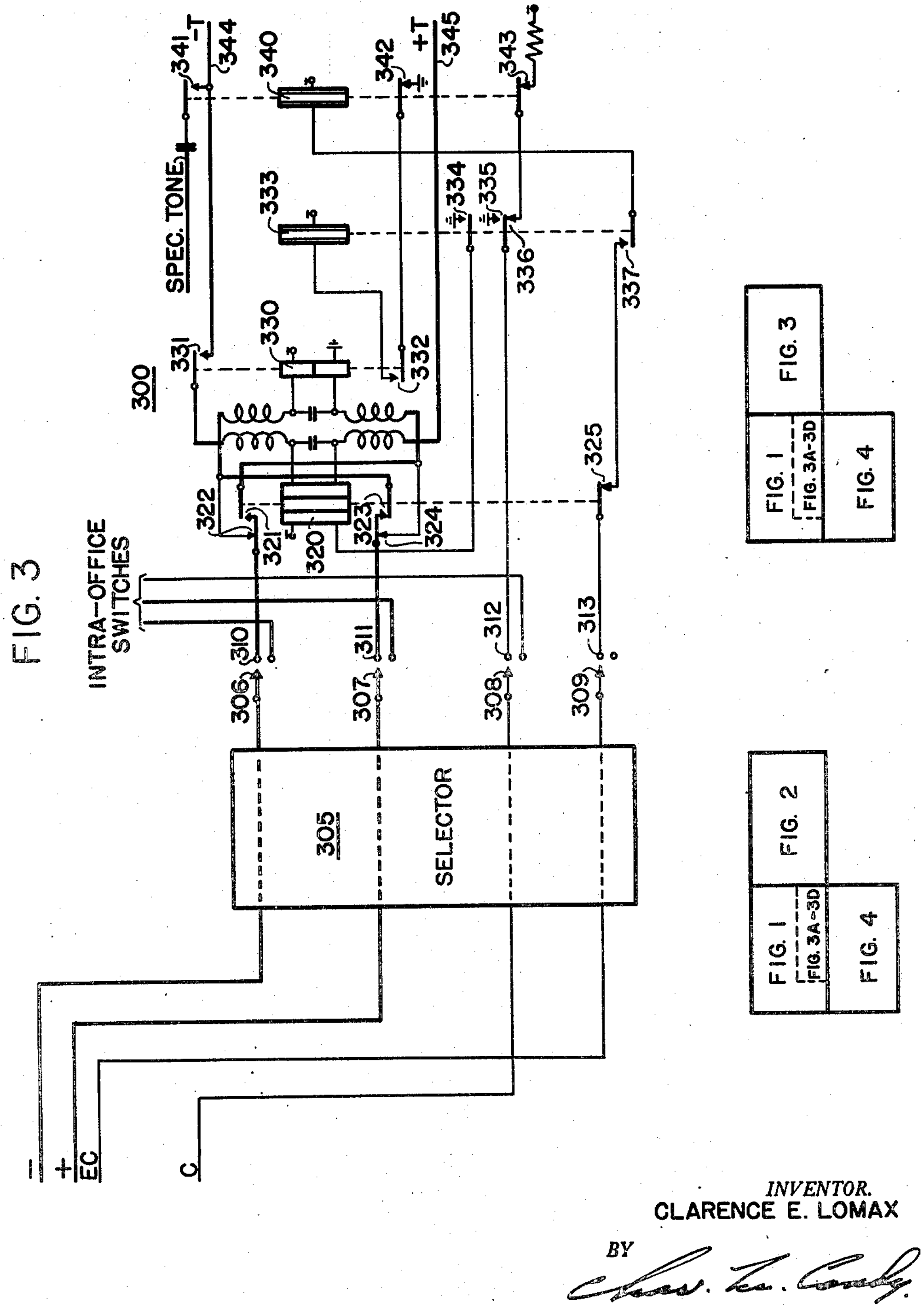

Referring now to Figs. 1 and 2, I will first describe the circuit operations involved in establishing a call through the finder 100 and selector 200 from the unrestricted subscriber's line 103. When the subscriber at the calling substation B initiates a call over the line 103, the line circuit 104 operates to connect battery potential to the control conductor 111 to mark the rotary position of line 103 in the bank of the finder switch 100, and to ground the control conductor 119 to thereby cause ground potential to be applied to the start conductor 181 extending to the distributor and group relays 182 and to also cause the ground potential to mark, in the vertical bank of the finder switch, the level wherein line 103 is terminated, the vertical contact in this case being indicated at 112.

The ground closed to the control conductor 119 and thus to the start conductor 181 initiates operation of the distributor and group relays 182, thereby to cause this preseletced idle finder 100 to be assigned to the use of the calling subscriber line 103. The distributor and group relays 182 are similar to and operate in a similar manner to those shown in the Patent 2,214,908 of Lomax and Baker, September 17, 1940, and reference may be had to this patent for a more detailed understanding of the operation of the distributor and group relays. A line circuit similar to 104 is also shown in the above patent. More particularly, distributor and group relays 182 operate to place ground potential on finder start conductor 178 and ground potential on vertical conductor 179. Ground potential on conductor 178 causes start relay 160 to operate. Relay 160 on operating closes a path between line conductors 170 and 171 by way of contacts 161 and resistance 142 to seize the selector circuit 200 in Fig. 2, closes the circuit from the rotary magnet 140 to the distributor and group relays 182 by way of contacts 128 and 165 and rotary conductor 177, and closes the circuit from vertical conductor 179 to the finder vertical magnet 130 through contacts 166. Operation of relay 160 also opens a point in the "all trunks busy" circuit to the distributor and group relays 182 at contacts 163 to give an "all trunks busy" signal if this was the last idle finder in the group associated with the distributor.

The ground potential on the vertical conductor 179 causes the vertical magnet 130 to operate to step the Strowger switch mechanism one step in the vertical direction and to connect, at contacts 131, ground to interrupt conductor 180. The ground connected to interrupter conductor 180 causes the distributor and group relays 182 to operate to remove the ground from vertical conductor 179 to cause the vertical magnet 130 to restore, removing the ground at contacts 131 from conductor 180. The removal of ground from conductor 180 causes the distributor and group relays 182 to operate to reconnect ground to vertical conductor 179 to again cause the vertical magnet 130 to operate to step the Strowger switch mechanism an additional step in the vertical direction and to re-connect ground to conductor 180 by way of contacts 131. The above cycle of operations is continued, the vertical magnet 130 and the distributor and group relays 182 interacting, to step the switch mechanism in a vertical direction until the vertical wiper 117 engages the contact in the vertical contacts associated therewith having marking ground potential thereon. In the present instance, the vertical wiper 117 engages contact 112 having the marking ground potential thereon. This ground on conductor 119 from the line circuit 104 is closed through bank contact 112 and wiper 117 to the distributor 182 by way of test conductor 174 and causes the distributor and group relays 182 to operate to remove the ground from vertical conductor 179 so that the vertical magnet 130 will restore and also to connect ground on rotary conductor 177.

It is noted that when the switch mechanism of the finder 100 is operated away from its normal position by the first operation of the vertical magnet 130, the vertical off-normal switch springs 150 are actuated. On closing, the V. O. N. springs 150 close a point in the incomplete circuit to the release magnet 145 at contacts 152, open a point at contacts 151 in the all trunks busy circuit, close ground to the incomplete guard circuit at contacts 153, and disconnect the C lead 169 from the guard circuit at contacts 154.

The ground on rotary conductor 177 from the distributor and the group relays 182 is closed to the rotary magnet 140 by way of contacts 128 and 165. When energized over the above traced circuit, the rotary magnet 140 operates to step the Strowger switch mechanism of the finder switch 100 one step in the rotary direction and to connect, at contacts 141, ground to interrupter conductor 180. This ground on conductor 180 causes the distributor and group relays 182 to operate to disconnect the ground from rotary conductor 177 to thereby cause the rotary magnet 140 to restore. Upon restoring, the rotary magnet 140 removes ground, at contacts 141, from interrupter conductor 180 to cause the distributor and group relays 182 to operate to reconnect ground to rotary conductor 177 and thus reenergize the winding of the rotary magnet 140. The rotary magnet 140 operates to cause the switch mechanism to take an additional step in the rotary direction and to reconnect ground to interrupter conductor 180. The rotary magnet 140 and the distributor and group relays 182 continue to interact in the manner described above until the switch mechanism is rotated to the position of the contact set terminating the calling subscriber line 103, at which time the wiper 115 of the wiper set engages the contact terminating the control conductor 111 of line 103, whereupon a circuit is completed from battery through the well-known B. C. O. relay (not shown) in the line circuit 104 to the distributor and group relays 182 by way of control conductor 111, wiper 115, and first test conductor 174. The distributor and group relays 182 operate to open the circuit to the rotary magnet 140 over rotary conductor 177 and close ground to the conductor 173. Ground on the conductor 173 operates relay 120. Relay 120 on operating opens further points in the circuits to the rotary and release magnets at contacts 128 and 127 respectively, closes a holding circuit to itself from ground on the C lead 169 from the selector 200 by way of contacts 124, closes the line conductors 109 and 110 to the selector circuit 200 at contacts 121 and 122, closes the ground on control conductor 169 to wiper 115 and control conductor 111 by way of contacts 125 to operate the B. C. O. relay in the line circuit, and closes ground by way of V. O. N. spring contacts 153, contacts 126 and contacts 158, and guard conductor 175 to the distributor and group relays 182. This ground closed to the guard conductor 175 causes the release of the distributor and group relays 182 which then operate to locate the next idle finder circuit available to the distributor in accordance with the preselecting feature of this line finder system and also marks this finder 100 busy to the distributor during subsequent selecting operations of the distributor while searching for idle finders in the same group of finders. Upon the release of the distributor and group relays 182, ground is removed from start conductor 178 causing relay 160 to restore. Relay 160 opens the first mentioned path between line conductors 170 and 171 at contacts 161, closes an alternate path at contacts 162 for applying the busy marking ground potential to guard conductor 175 from ground at contacts 153, and opens points in the circuits to the vertical magnet 130 and rotary magnet 140 at contacts 166 and 165 respectively. Since line 103 is an unrestricted line, the extra control contact 129 associated with this line in the banks of the finder switch is standing unconnected.

Referring now to Fig. 2, the selector circuit 200 is seized by the finder circuit 100 when the line loop was closed to the two windings of relay 230 by way of contacts 161. Relay 230 on operating closes relay 240 by way of contacts 227 and 231. Relay 240 operates, closes relay 235 to the E. C. conductor by way of contacts 242, closes ground to relay 210 by way of contacts 241 and closes a circuit to the upper winding of relay 250 by way of contacts 246, 262 and 264. Relay 235 remains unoperated and performs no function on unrestricted calls, wiper 116 of the finder 100 having encountered no ground potential. Relay 250 operates, prepares the pulsing circuit to the vertical magnet 257 at contacts 251, closes the time pulse conductor 275 to the upper winding of relay 260 by way of cam spring contacts 271 and contacts 254, and closes the battery through the rotary magnet 258 and contacts 255 to the Supy. conductor. This battery on the Supy. lead will cause an alarm to be given and a timed release of this circuit to take place should the calling party fail to dial within a certain time interval. On operation of relay 120 in finder 100, the dial tone connected to the + side of the line by way of cam springs 274 and the lower winding of relay 230 is closed through to the subscriber's receiver circuit.

At this time the distributor and group relays 182 have been released, the finder 100 is being held under control of the selector 200 from ground at contacts 246 of relay 240 on the control conductor 169, the selector 200 in turn being held by the subscriber over the line loop, and selector 200 is now ready to receive impulses from the calling subscriber substation B to establish a connection to a called subscriber substation or a toll position over a succeeding switch train in a well-known manner.

The selector 200 operates in response to the first series of impulses from the subscriber's dialing device to select a group of outlets to succeeding switches. More particularly, relay 230 follows the first series of impulses and when at normal opens the circuit to relay 240 at contacts 231 and closes the circuit to the lower winding of relay 250 and the vertical magnet 257 in parallel by way of contacts 227, 232, 243 and 251. The vertical magnet 257 follows the first series of impulses and steps the Strowger switch wipers to the dialled bank level. On the first vertical step of the shaft, the V. O. N springs operate and at contacts 264 open the circuit to the upper winding of relay 250. Relays 240 and 250, due to their slow release characteristics, remain operated during the first series of impulses, relay 250 being energized through its lower winding. After the first series of impulses, relay 230 remains steadily operated, opening the circuit to the lower winding of relay 250 and the vertical magnet at contacts 232. Relay 250 releases, opening the circuit to the Supy. conductor at contacts 255 to stop the timer and the alarm and closes a self-interrupting driving circuit to the rotary magnet 258 by way of contacts 256, 266, 268, 228, 212 and 245.

The rotary magnet operates, stepping the switch wipers to the first bank contacts in the selected bank level and opening its own circuit at contacts 268. If the succeeding switch connected to the first bank contacts is idle, battery will be standing on the C bank contact and relay 210 will operate by way of contacts 236 and 241 over wiper 282 to stop the rotary stepping. If the succeeding switch connected to the first contacts is busy, the battery on the C contact will be absent and relay 210 will not operate. In case of this busy condition, the rotary magnet will release, again closing the circuit to itself through contacts 268. The rotary magnet will operate to cause the switch wipers to take a second step and so on until a free succeeding switch is found. When relay 210 operates on finding an idle succeeding switch, it opens the self-interrupting circuit to the rotary magnet 258 at contacts 212 and closes the circuit to relay 220 at contacts 211. Relay 220 operates, closes the line loop at contacts 222 and 224 through to seize the succeeding switch, closes a holding circuit to itself from ground at contacts 246 by way of contacts 262 and 226, shunts relay 210 at contacts 225, opens a point in the circuit to the rotary magnet at contacts 228, and opens the circuit to relay 240 at contacts 227. Relays 230, 210 and 240 release. Before relay 240 has had time to release and remove the holding ground at contacts 246, the succeeding switch places ground on the C lead over wiper 282 to hold relay 220 by way of contacts 225 and 226. The selector 200 and finder 100 are held under control of the succeeding switch over the C lead, the succeeding switch in turn being held by the calling subscriber over the line loop. The call may be automatically completed to a local party or a toll position over the subsequent switch train.

If all the succeeding switches had been busy, the rotary magnet 258 would step the wipers to the 11th rotary position at which time the cam springs 270 would operate. Operation of the cam springs opens the time pulse conductor 275 to the upper winding of relay 260 at contact 271, closes the circuit to the upper winding of relay 250 by way of contacts 245, 212, 228 and 272, and connects busy tone to the + side of the line from conductor 278 by way of contacts 238, 273 and the lower winding of relay 230 to indicate the busy condition to the calling subscriber. Relay 250 operates, prepares a circuit from ground at contacts 227 to the + side of the line by way of contacts 262, and closes battery to the Supy. lead by way of contacts 255 to give an alarm should the calling party fail to release.

When the parties release from a completed call, the ground is removed from the C lead in the succeeding switches, opening the holding circuits to relay 220 in the selector, relay 120 in the finder and the B. C. O. relay in the line circuit. The B. C. O. relay in the line circuit releases to release the line circuit. Relay 220 in the selector releases and closes the circuit to the release magnet 259 by way of contacts 227, 232, 244, 253 and 265. The release magnet 259 operates to return the selector switch mechanism to normal in a well-known manner. In the normal position, the switch mechanism releases the V. O. N. springs which open the circuit to the release magnet 259 at contacts 265. The selector circuit is now at normal. Release of relay 120 in the finder circuit closes the circuit to the release magnet 145 at contacts 127 by way of contacts 152, 156 and 163, the release magnet operating to return the finder switch mechanism to normal. When the switch mechanism returns to normal, the V. O. N. springs 150 restore, opening the release magnet circuit at contacts 152, closing the all trunks busy circuit at contacts 151, and removing ground from the guard conductor 175 at contacts 153 to mark the finder circuit as idle to the distributor and group relays 182.

When the calling subscriber at B releases from an all trunks busy, the line loop is opened to relay 230. Relay 230 releases, opening the circuit to relay 240 at contacts 231 and closing the circuit to the lower winding of relay 250 at contacts 232 by way of contacts 227, 243 and 251 to hold relay 250 operated. Relay 240 releases, opens the circuit to the lower winding of relay 259 at contacts 243, opens the circuit to the upper winding of relay 250 at contacts 245 and closes ground to the + side of the line by way of contacts 227, 232, 244 and 252, relay 250 remaining operated for a short period due to its slow release characteristics. The ground connected to the + wiper is used to operate a meter for registering overflow calls if contacts on the 11th step of the wiper banks are provided for this service. Relay 250 releases, removes the ground from the + line conductor at contacts 252 and closes the circuit to the release magnet 259 through contacts 253 by way of contacts 227, 232, 244 and 265. The release magnet 259 operates to return the selector to normal, restoring the cam springs and the V. O. N. springs. Release of relay 240 also removed ground from the C lead at contacts 264, opening the circuit to relay 120 in the finder 100. Relay 120 releases to cause the finder 100 to return to normal in the same manner as previously described.

The selector 200 is provided with "permanent" lock-out, a feature which provides that this selector circuit will release the preceding finder 100 and itself if the selector is not stepped off-normal within a predetermined time after seizure. It was noted that on seizure relay 250 operated and closed the time pulse conductor 275 to the upper winding of relay 260 by way of contacts 271 and 254. If the subscriber dials within a certain period of time to step this selector off-normal, relay 250 releases to open the circuit to the upper winding of relay 260 at contacts 254. But if the dialing party fails to dial within a predetermined length of time, the associated timing equipment will momentarily place ground on the time pulse lead 275 closing the circuit to the upper winding of relay 260. Relay 260 operates, connects the C lead to the ground and time cut-off lead 283 at contacts 261, opens the circuit from ground at contacts 246 to the C lead at contacts 262, and closes a holding circuit to its lower winding from ground at contacts 246 by way of contacts 263. Ground standing on the ground and time cut-off lead 283 holds relay 120 in finder 100 operated. After another predetermined time interval, the associated timing equipment removes ground from the time cut-off lead to thus open the circuit to relay 120. Relay 120 releases to return the finder circuit 100 to normal and also open the line loop to relay 230 at contacts 121 and 122. Relay 230 releases to return the selector 200 to normal.

Having described the circuit operation of this system for establishing a connection from a calling subscriber's line which is not subject to restricted service at any time, I will now describe the circuit operation involved in establishing a connection from a line which is subject to restricted service at certain times of the day. Subscriber line 101 has been arranged so that it is subject to restricted service. The fourth bank contact 108 in the finder banks which terminates the line circuit of 101 has been connected, through the line circuit, to conductor 118, conductor 118 being connected to one of the four control means, Figs. 3A to 3D inclusive.

Figs. 3A to 3D inclusive illustrate a plurality of common timer devices each consisting of a cam device or a combination of a cam device and a relay. The cams 350, 355, 360 and 362 are continuously rotating cams which rotate at a speed of one revolution every 24 hours. The cams are driven by a single synchronous motor (not shown) or they may be individually driven. As illustrated, they cause operation of their cam springs twice every 24 hours, the cams being replaceable so that any periods of the day may be chosen to close the cam springs. For the purpose of this invention, these cams were designed to close their associated cam springs during the two usually busiest telephone traffic periods of the day. The relay 352 of Fig. 3B is controlled by a distant operator or a local operator over the control switch of Fig. 4 or is controlled automatically by relay 356 which responds to traffic conditions in the exchange.

The finder switch 100 may be connected with any one of the timer devices of Figs. 3A to 3D. A similar finder in the same system may be connected with a different one of the time devices than this finder 100.

Assume that the subscriber A is attempting to establish a connection during one of the two predetermined busy periods in the day and also that Fig. 3A is associated with the finder 100. On initiating a call, the line circuit 102 operates as previously explained to ground conductor 119 and to connect battery potential to the control conductor 107 to mark the line's position in the bank of the finder. The distributor and group relays 182 and finder 100 operate exactly as previously described to locate the calling line 101, to seize the selector circuit 200, and to switch the subscriber's line loop through to the selector. Relay 120 on operating to connect the line circuit 102 through to the selector also closes conductor 118 over the E. C. (extra control) contact 108 and wiper 116 by way of contacts 123 to the E. C. conductor 172 through to the selector 200. Since this call is being made during one of the busy periods of the day, the cam 350 has closed the contacts 351 and ground is standing on conductor 118. This ground is connected over the E. C. conductor to the selector and through contacts 242 and shaft springs 239 to relay 235, relay 240 being operated on seizure of the selector.

The selector circuit is so arranged that only local calls will be restricted while toll calls will be unrestricted. This is accomplished by providing the selector switch mechanism with shaft springs 239, the switch mechanism being designed so that the shaft springs 239 will operate to open their contacts only on levels in which toll switches terminate, the shaft springs 239 remaining unoperated on all levels in which succeeding switches for use in making local calls terminate. Relay 235 operates from the ground on the E. C. conductor and opens the ground from relay 210 at contacts 236 and also prepares a circuit from the special tone conductor 277 to the +side of the line at contacts 237. In response to the first digit dialled by the calling subscriber, the selector mechanism steps to the level designated by the first digit. If the first digit indicates a local call, the shaft springs 239 will remain unoperated after the first digit has been dialled. The rotary magnet will then operate self-interrupted to rotate the switch wipers over the bank level selected by the first digit. Since relay 235 has opened one side of relay 210 at contacts 236, relay 210 will never operate even though the switch wipers encounter an idle succeeding switch. The switch wipers will step to the 11th rotary position at which time the cam springs 270 will operate. Operation of the cam springs closes a circuit from ground through contacts 245, 212, 228 and 272 to the upper winding of relay 250, opens the time pulse conductor 275 from the upper winding of relay 260 at contacts 271, and closes the special tone that is connected to the special tone conductor 277 to the +side of the line by way of contacts 237 and 273 and the lower winding of relay 230. This special tone is used to indicate to the calling subscriber that his call has been prevented from being completed. Relay 250 operates through its upper winding and subsequent operations of the selector circuit and the finder circuit in releasing after the calling party has hung up are similar to those previously described.

If this call is a toll call, the shaft springs 239 will operate when the switch mechanism shaft has reached the toll level in response to the first digit dialled by the calling subscriber. Operation of the shaft springs 239 opens the circuit to relay 235 which restores to close ground to relay 210. The selector circuit will now hunt in the rotary direction for an idle succeeding switch and relay 210 will operate when an idle trunk is found, subsequent operation of the selector and the finder being the same as described for a call from an unrestricted line.

As described, the selector 200 of Fig. 2 provides that local calls from the restricted lines during the normally busy periods of the day are prevented while toll calls from the same lines during the same periods are not prevented. This feature was provided by using normal post or shaft springs. These normal post springs may be thought undesirable if only inter-office calls are to be prevented because there may be many selectors and only a relatively few inter-office trunks. For this reason, Fig. 3 has been included to show how restriction of calls may be accomplished in inter-office repeaters rather than in first selectors. Referring to Figs. 1, 3 and 3A to 3D inclusive, the finder 100 operates in a manner exactly similar to that previously described to locate a calling subscriber's line 101 and 103. Operation of relay 160 closes the line loop to seize the selector circuit 305. The selector 305 responds to the first dialled digit from the calling subscriber's dialing device to select an outlet which terminates in the bank of the selector circuit. Assuming that the call is not an inter-office call, it will be completed in a well-known manner and unrestricted in any way. But if the call is an inter-office call, the selector 305 will seize an idle inter-office repeater circuit such as repeater 300, the repeater circuit being marked idle on the banks of the selector by the presence of resistance battery through contacts 343 and 336 on the C bank contact 312. On seizure, the line loop is closed over the line wipers 306 and 307 to the two windings of relay 330 by way of contacts 321 and 324. Relay 330 operates, closes the circuit to relay 333 at contacts 332 and closes a line-loop through the right-hand operating winding of polar relay 320 by way of contacts 331 over the +T and −T leads to seize the succeeding switch. Relay 333 operates, closes the left-hand polar winding of relay 320 at contacts 334, grounds the C lead back to the preceding switch train at contacts 335, and closes the E. C. conductor to relay 340 at contacts 337.

Assuming this call is being made from an unrestricted line such as line 103, ground will not be standing on the E. C. lead and relay 340 will remain unoperated. The ground on the C lead at contacts 335 holds both the selector 305 and the finder 100 under control of the repeater 300, the repeater 300 in turn being held over the line by the calling subscriber B. This ground on the C contact 312 also marks this repeater as busy in the banks of the preceding group of selectors. The well-known polar relay 320 will not operate on the strength of its polar winding alone and will not operate until the battery on the line conductors +T and −T is reversed on answer by the called party. Relay 330 follows the remaining series of impulses from the calling subscriber's dialing device and, at contacts 331, opens and closes line loop to complete the succeeding switch train to the called line. Relay 333, due to its slow release characteristics, will remain operated during impulsing. When the called party answers, battery is reversed back on the line conductors −T and +T in a well-known manner to operate polar relay 320. Operation of relay 320 reverses the battery through relay 330 on the line conductors back to the calling line at contacts 322 and 323 for the purpose of metering, supervision, etc. if provided.

When the calling party releases, the line loop is opened to release relay 330. Relay 330 on releasing opens the line loop at contacts 331 to release the succeeding switch train and opens relay 333. Relay 333 restores and removes the ground from the C conductor at contacts 335 to release the preceding selector 305 and finder 100 which then return to normal.

Assuming that the inter-office call is being made from a line which is subject to restricted service such as line 101 and that the call is being made during one of the normally busy periods of the day, ground will be standing on the E. C. conductor from contacts 351 in Fig. 3A through the selector 305 to wiper 309. When relay 333 operates on seizure of the repeater circuit 300, this ground on the E. C. conductor is closed to relay 340 at contacts 337. Relay 340 operates, opens the circuit to relay 333 at contacts 342 and closes special tone at contacts 341 to inform the calling party that the call is being prevented.

Relay 333 releases, opens the polar winding of relay 320 at contacts 334, opens the circuit to relay 340 at contacts 337, and removes ground from the C lead at contacts 335 to cause the preceding switches to release and return to normal. Relay 340 releases and closes resistance battery to the C bank contact 312 to mark this circuit as idle in the selector banks. The circuit to relay 340 from the E. C. lead is taken through break contact 325 of relay 320 so that if a subscriber who is subject to restricted service has made a call during a non-restricted period and has received an answer, he will not be released when the restricted period starts.

Having particularly described the operation of the finder 100, the selector 200 and the repeater 300 in association with Fig. 3A, I will now describe how Figs. 3B, 3C, and 3D may supplant Fig. 3A in the system. A control circuit shown in Fig. 4 is used to ground leads 364 and 365 at different times to perform certain functions in conjunction with the control devices Figs. 3B, 3C and 3D, and a brief description of how Fig. 4 is operated to transfer ground between leads 364 and 365 will be given after the operations of the control devices have been described.

Fig. 3B provides a means for giving restricted service during the normally busy periods of the day but then only when an operator desires to render the restrictive equipment operative or only when actual heavy traffic conditions warrant restriction of calls. This circuit is also designed so that once the restriction equipment has been started during the predetermined normally busy period of time, it will continue until the end of such period regardless of the subsequent actions of the operator or actual conditions of the traffic. Cam 355 is similar in actions to cam 350; it closes its contacts 356 and 357 during predetermined busy times of the day. However, lead 118 is not grounded to cause line 101 to be subjected to restricted service until relay 352 has been operated. Relay 352 can be operated by the operation of relay 358 or the grounding of lead 364. Relay 358 is a traffic responsive relay which automatically operates when the exchange traffic becomes excessively heavy as indicated by well-known "all trunks busy" circuits, etc. Lead 364 is under the control of an operator and is grounded when she desires to ground the same. In either instance, relay 352 will operate and will lock up under control of the cam 355 by way of contacts 354 and 357 independent of relay 358 or the distant operator. Relay 352 will also close ground at contacts 356 to lead 118 to subject line 101 to restricted service as previously described, this restricted service remaining until the end of the normally busy period when cam 355 causes contacts 357 and 356 to open.

Fig. 3C provides means for giving restricted service only during the predetermined normally busy period of the day which may be rendered inoperative at any time during that predetermined period at the discretion of an operator. Cam 360 is similar to cam 350 and closes contacts 361 during preselected periods of the day. Contacts 361 close the ground standing on lead 365 by way of contacts 474 to lead 118 to subject line 101 to restricted service. Ground remains connected at contacts 474 until such times as the operator shall cause operation of relay 470 to open contacts 474. Relay 470 is under complete control of an operator and it can easily be seen that during the normally busy period of the day, the operator may cause restricted service to be effective or not as she desires.

Fig. 3D provides means for giving restricted service during the normally busy period of the day in all instances and for also allowing an operator to render restricted service operative at any other period in the day. Ground will be closed to lead 118 during the normally busy periods of the day thru contacts 363 and 474 or thru contacts 475 depending on whether or not relay 470 is operated. During all other periods of the day, the operator may cause restriction of calls to take place by causing operation of relay 470 and subsequent closing of contacts 475.

The control circuit to Fig. 4 is designed to give an operator automatic control over the timing devices. Only the operations of Fig. 4 needed to explain its control over the devices 3B to 3D will be described, other features of the control circuit being unnecessary to this invention. This control circuit may be seized by an operator over the line leads +L and −L by closing a line loop to relay 410. Relay 410 operates and closes relay 415. Relay 415 operates and prepares the pulsing circuit to the stepping magnet 461 of the rotary switch 460. Assuming that relay 470 is in the unoperated position, therefore ground being connected to conductor 365 at contacts 474, and that the operator desires to operate relay 470 so as to transfer the ground potential from conductor 365 to conductor 364, the operator sends a series of nine impulses over the line loop. Relay 410 follows the series of impulses, releasing and reoperating nine times, and repeats the impulses to the minor switch stepping magnet 461 by way of contacts 411, 418 and 442. Slow-release relay 415 remains operated during pulsing. On the first closure of contacts 411, relay 435 operates thru its lower winding in parallel with the stepping magnet 461 and remains operated for the remaining pulses due to its slow-release characteristics. On the first step off normal by the minor switch 460, the off-normal springs 464 operate to cause operation of relay 430. Relay 430 prepares a circuit to the lower winding of relay 440 at contacts 432 and closes a part of the circuit to the minor switch release magnet 462 at contacts 433. At the end of the series of impulses, the minor switch has stepped to the ninth bank contact and relay 410 remains steadily operated. Slow-release relay 435 releases shortly thereafter. A circuit is then closed from ground by way of contacts 416, 451, 436, wiper 463, ninth bank contact and upper winding of relay 470. Relay 470 is a differential relay designed so that it will operate and hold operated on either of its windings alone but will release when both windings are closed simultaneously. Relay 470 operates and closes a holding circuit to its upper winding at contacts 471, prepares a circuit to its lower winding by way of the tenth bank contact at contacts 472, and transfers ground from conductor 365 to conductor 364 at contacts 474 and 475. The release of relay 435 after the series of impulses also closes the lower winding of relay 440 by way of contacts 412, 432, 438, and 453. Relay 440 operates, locks up to ground on the C lead sent forward from the preceding equipment and opens the pulsing circuit from relay 410 to the stepping magnet 461 at contacts 442 to prevent subsequent false operation of the stepping magnet 461.

Relay 470 now being operated, the operator may release the connection leaving relay 470 locked up. Release by the operator opens the line loop to relay 410 and removes ground from the C lead. Relay 410 releases, opens relay 415, and closes the circuit to the release magnet 462 by way of contacts 411, 419, and 433. Relay 440 releases. The release magnet 462 operates to return the minor switch 460 to normal. In the normal position, relay 430 releases and opens the release magnet circuit. Relay 470 remains operated, holding ground on lead 364 until such time as the operator desires to transfer the ground from lead 364 to lead 365.

A means is provided in the control circuit for allowing the operator to check to see if relay 470 is in the operated position. She does this by seizing Fig. 4 over the line and dialing the digit nine. Ground standing on the ninth bank contact from contact 471 causes operation of relay 450 before relay 435 releases after dialing. Operation of relay 450 closes a special tone on the +N lead to the operator over the +L lead to inform her that the relay 470 is operated.

When the operator desires to release relay 470, she seizes the control circuit over the line leads +L and −L and sends ten impulses over the line. The minor switch wipers take ten steps and close the circuit to the lower winding of relay 470. The two windings of relay 470 now being closed simultaneously cause relay 470 to release and transfer the ground from lead 364 to lead 365. The operator may thus control the application of restricted service.

Having described a preferred embodiment of the invention, it is to be understood that various modifications may be made therein, and the appended claims are intended to cover all such modifications as fall within the true spirit and scope of the invention.

What is claimed is:

1. In a telephone system, a calling line, means for establishing a connection from said calling line, disabling means operative to disable said means to thereby prevent said calling line from establishing a connection, a clock device running in accordance with the time of the day, traffic responsive means controlled by traffic conditions in the system, a control device for operating said disabling means, and two contacts jointly controlling said control device, one of said contacts being governed by said traffic responsive means for actuating said control device upon the occurrence of a certain traffic condition and the other contact being a holding contact governed by said clock device for independently locking said control device in actuated condition until the end of a certain period of the day regardless of the continued existence of said traffic condition.

2. In a telephone system, a plurality of lines including lines of a restricted and a non-restricted class, switching equipment, a clock device running in accordance with the time of the day, a non-numerical switch, said non-numerical switch being interposed between said lines and said switching equipment and being automatically positioned upon the initiation of a connection on one of said lines to interconnect said line and said equipment, and said switching equipment being directively operated under the control of said line for further extending said connection, disabling means in said switching equipment, first contact means associated with and actuated by said clock device, and second contact means associated with and actuated in accordance with the positioning of said non-numerical switch, both contact means being in circuit connection with and controlling said disabling means, but the circuit connections of said contact means differing as between lines of the restricted and non-restricted class, and said disabling means being made effective over the circuit connections pertaining to lines of the restricted class, in response to both said contact means being concurrently in actuated condition for preventing the extension of a connection by said switching equipment.

3. In a telephone system, the combination as defined in claim 2, and further including a contact device connected in series with said first contact means, said contact device being operative under the control of an operator for preventing said disabling means from becoming effective regardless of the concurrent actuation of said first and second contact means.

4. In a telephone system, the combination as defined in claim 2, and further including an operator-controlled contact device in circuit connection with said disabling means independently of said first contact means, said disabling means also being made effective over the circuit connection pertaining to lines of the restricted class, in response to both said contact device and said second contact means being concurrently in actuated condition for preventing the extension of a connection.

5. In a telephone system, a plurality of lines including restricted and non-restricted lines, switching equipment directively operated under the control of a given one of said lines for extending a connection originated on said line, a clock device running in accordance with the time of the day, a non-numerical switch interposed between said line and said switching equipment, disabling means in said switching equipment for preventing at certain times of the day, the extension of a connection from a restricted line, a circuit for making said disabling means effective, said circuit including in series relation first and second contact means respectvely associated with said clock device and said non-numerical switch, said first contact means being actuated by said clock device for closing one point of said circuit and said second contact means being connected in the case of restricted lines only, to said first contact means and being actuated under the control of said non-numerical switch for closing another point of said circuit.

6. In a telephone system, a plurality of lines including lines of a restricted and a non-restricted class, switching equipment, a clock device running in accordance with the time of the day, a non-numerical switch, said non-numerical switch being interposed between said lines and said switching equipment and being automatically positioned upon the initiation of a connection on one of said lines to interconnect said line and said equipment, and said switching equipment being selectively operated under the control of said line for further extending said connection in one of a plurality of traffic directions, disabling means in said switching equipment, first contact means associated with and actuated by said clock device, second contact means associated with and actuated in accordance with the positioning of said non-numerical switch and third contact means associated with and actuated in accordance with the selection by said switching equipment of a predetermined traffic direction, all three contact means being in circuit connection with and controlling said disabling means, but the circuit connections of at least some of said contact means differing as between lines of the restricted and non-restricted class, and said disabling means being made effective over the circuit connections pertaining to lines of the restricted class, in response to all three contact means being concurrently in actuated condition for preventing the extension of a connection by said switching equipment.

7. In a telephone system, the combination as defined in claim 6, and further including traffic responsive means, and a contact associated with the last-mentioned means and connected in series with said first contact means, said contact being actuated under the control of said traffic responsive means for preventing said disabling means from becoming effective upon the concurrent actuation of said first, second and third contact means except when said contact also is actuated.

8. In a telephone system, the combination as defined in claim 6, and further including a contact device connected in series with said first contact means, said contact device being operative under the control of an operator for preventing said disabling means from becoming effective regardless of the concurrent actuation of said first, second and third contact means.

References Cited in the file of this patent

UNITED STATES PATENTS

| Number | Name | Date |
|---|---|---|
| 1,238,130 | Goodrum | Aug. 28, 1917 |
| 1,678,185 | Harper | July 24, 1928 |
| 1,694,169 | Friendly | Dec. 4, 1928 |
| 1,694,934 | Babcock | Dec. 11, 1928 |
| 2,375,066 | Avery | May 1, 1945 |
| 2,385,061 | Clark | Sept. 18, 1945 |